Patented Oct. 5, 1948

2,450,775

UNITED STATES PATENT OFFICE 2,450,775

METHOD OF CONCENTRATING HIGHLY COLLOIDAL FOOD PRODUCTS

George G. Zahm, Buffalo, N. Y., assignor to Hurd Corporation, New York, N. Y., a corporation of Delaware No Drawing. Application July 20, 1945, Serial No. 606,267

4 Claims. (Cl. 99—210)

This invention relates to certain new and useful improvements in the method of concentrating highly colloidal food products and, more particularly, materials such as whole fresh eggs. As is well known, the farm production of eggs is highly seasonal in character and it has become a more or less accepted practice in the food industry to store the excess production occurring in peak periods for consumption during the periods when production is low. Furthermore, eggs, being highly breakable and subject to comparatively rapid deterioration and spoilage, present a serious shipping problem. As a result, a substantially large volume of eggs are broken and either frozen or dried in industrial plants designed for that purpose. Both frozen whole eggs and egg powder have come to be fairly standard commodities in the food industry for industrial uses, such as commercial baking and the manufacture of a wide variety of similar commercial food products.

Egg powder is ordinarily reconstituted by addition to a suitable volume of water to produce a liquid having approximately the same total solid contents as the original whole eggs. By beating or whipping such reconstituted egg powder, and pouring it into a skillet after the manner of so-called scrambled eggs, a product results which may be eaten directly and somewhat resembles scrambled eggs, except that it has been found to be relatively flat and soggy and pungent tasting as compared to scrambled eggs made from fresh whole eggs. Similarly, when egg powder is added to commercial baking mixes as a substitute for fresh whole eggs, the resultant effect upon the taste, leavening, and general physical characteristics of the ultimate baked product compares quite unfavorably with a similar product made with a comparable quantity of fresh whole eggs. Although these disadvantages inherent in egg powder are well recognized, they are more or less tolerated because of economy and convenience.

As is well known, egg powders are commonly produced by thoroughly mixing the fresh whole eggs in liquid form and projecting the liquid under pressure into a spray-drying chamber of any one of several different conventional types. The powder thus manufactured is collected, sifted, and very quickly chilled to prevent spoilage. It is furthermore preferable that egg powder should be stored, shipped, or otherwise handled continuously from the time of manufacture until the time of use, under refrigerated conditions, in order to preserve optimum quality in the product, and this, of course, creates substantial transportation and handling problems. So far as I am aware, however, it has heretofore been considered impossible to concentrate whole fresh liquid eggs by any other method than complete dehydration to solid state or by the addition of additive ingredients, such as preservatives and the like.

It is, therefore, the primary object of the present invention to provide a unique method for the concentration of whole fresh liquid eggs in the liquid phase, to produce a viscous liquid egg concentrate which may be shipped and handled with equal or even greater economy than egg powder.

It is a further object of the present invention to provide a method for the production of a liquid egg concentrate which can be reconstituted simply and conveniently for the formation of an egg product having remarkably improved physical characteristics, such as taste and baking properties.

And with the above and other objects in view, my invention resides in the novel process presently described and pointed out in the claims.

In practicing the method of the present invention, whole fresh eggs are opened or "broken" and thoroughly mixed in the usual manner and the resulting liquid forced to travel in a relatively thin film and at comparatively high lineal velocity over a heating exchange surface in a highly evacuated chamber. For this purpose, I have found it preferable to employ a long evaporator column of the type more fully disclosed and described in my co-pending application Serial No. 575,512, filed January 31, 1945, having a long centrally disposed impeller including a plurality of radially projecting vanes, the impeller being rapidly rotated as the fluid flows downwardly over the inner face of a suitably jacketed column. By this means, the whole eggs will travel downwardly through the column in a relatively thin cylindrical film and will be whirled around during the course of downward travel at substantially high velocity. The column itself is heated by the external application of steam or other heating medium, to a temperature of approximately 120° F. and a vacuum approaching the maximum theoretical possible vacuum at such temperature is maintained. It has been found that by employing a column of approximately fifteen feet in height, the concentrate drawn off at the bottom will contain substantially in excess of fifty per cent total solids, and will have the form of a relatively viscous liquid which may be placed in suitable containers and stored under refrigerated conditions, or may, if desired, be vacuum packed and stored at room temperature.

It has been found that fresh whole eggs concentrated by the present process have remarkably improved physical characteristics when reconstituted. It has also been found by baking tests that the addition of egg concentrate to commercial bakery mixes in a quantity comparable to the amount of whole fresh eggs which would be required, produces a result that is certainly equivalent, and in some cases superior, to whole fresh eggs in terms of the leavening characteristics, cellular structure, color, taste, and moisture retention properties of the finished baked goods. Actually, in some commercial mixes used for baking tests, it was found that when egg concentrate produced in accordance with the present invention was substituted in comparable quantities for fresh whole eggs, the resulting product was actually lighter, had better texture, and, most important of all, retained moisture for remarkably long periods of time, which, of course, retarded staleness and increased palatability. Furthermore, when the egg concentrate produced according to the present method is reconstituted by the addition of water, to a dilution substantially equivalent to the solid content and consistency of normal fresh eggs, the product may be cooked for direct table consumption in the manner of scrambled eggs and will result in a product which is fluffy in texture, excellent in taste, and is almost indistinguishable in taste, color, and other physical characteristics from scrambled eggs made from whole fresh eggs. In this case, as in the case of baked products, apparently the present process does not destroy, or in any way adversely affect, the surface tension characteristics and foam producing properties, and apparently the retention of such properties indicates that the method of concentration of the present invention in no way harms or impairs the egg components.

While I prefer to use the type of evaporative column disclosed in my application Serial No. 575,512 above referred to, it should be noted that other types of mechanical apparatus may be employed, it being the essential feature of the present invention to provide some suitable means whereby the whole fresh eggs may be caused to move through a highly evacuated chamber over a suitable heat exchange surface in a relatively thin film and at high velocity under the influence of a suitable mechanical impelling agent, and it should be understood that such changes in the details of the present process may be made without departing from the scope of the invention as defined in the following claims.

Having thus described my invention what I claim and desire to secure by Letters Patent is:

1. The process of concentrating eggs in the liquid phase which comprises breaking and thoroughly mixing whole fresh eggs to form a substantially uniform liquid, and passing such liquid vertically through an evacuated chamber at a relatively high rate of speed and in a relatively thin continuous film while subjecting it to mechanically applied pressure.

2. The process of concentrating eggs in the liquid phase which comprises breaking and thoroughly mixing whole fresh eggs to form a substantially uniform liquid, and passing such liquid vertically through an evacuated chamber at a relatively high rate of speed and in a relatively thin continuous film while subjecting it to non-turbulent agitation.

3. The process of concentrating eggs in the liquid phase which comprises breaking and thoroughly mixing whole fresh eggs to form a substantially uniform liquid, and passing said liquid vertically through an evacuated chamber in the form of a continuous film while causing said film to move peripherally at a relatively high rate of speed so that while the surface of the film is exposed to the highly evacuated atmosphere within the chamber the particles within the film are, by reason of such rapid movement, subjected to substantial mechanical force.

4. The process of concentrating eggs in the liquid phase which comprises breaking and thoroughly mixing whole fresh eggs to form a substantially uniform liquid, and forcing the liquid to travel in a relatively thin continuous film at substantially high peripheral velocity while passing vertically through a highly evacuated chamber over a heat exchange surface at a temperature not in excess of 120° F.

GEORGE G. ZAHM.

REFERENCES CITED

The following references are of record in the file of this patent:

UNITED STATES PATENTS

| Number | Name | Date |
| --- | --- | --- |
| 131,507 | Davis | Sept. 24, 1872 |
| 1,735,397 | Hiller | Nov. 12, 1929 |
| 1,799,478 | Peebles | Apr. 7, 1931 |